US012791432B2

(12) United States Patent
Matsuura et al.

(10) Patent No.: US 12,791,432 B2
(45) Date of Patent: Nov. 10, 2026

(54) OPTICAL FIBER CHARACTERISTIC MEASUREMENT DEVICE AND OPTICAL FIBER CHARACTERISTIC MEASUREMENT METHOD

(71) Applicant: Yokogawa Electric Corporation, Tokyo (JP)

(72) Inventors: Satoshi Matsuura, Musashino (JP); Yoshihiro Kumagai, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 16 days.

(21) Appl. No.: 19/120,330

(22) PCT Filed: Sep. 22, 2023

(86) PCT No.: PCT/JP2023/034556

§ 371 (c)(1), (2) Date: Apr. 11, 2025

(87) PCT Pub. No.: WO2024/080104

PCT Pub. Date: Apr. 18, 2024

(65) Prior Publication Data

US 2026/0126345 A1 May 7, 2026

(30) Foreign Application Priority Data

Oct. 13, 2022 (JP) ................................ 2022-164406

(51) Int. Cl.

| | |
|---|---|
| ***G01M 11/00*** | (2006.01) |
| ***G01D 5/353*** | (2006.01) |
| ***G01K 11/322*** | (2021.01) |

(52) U.S. Cl.

CPC ......... *G01M 11/39* (2013.01); *G01D 5/35364* (2013.01); *G01K 11/322* (2021.01); *G01M 11/333* (2013.01)

(58) Field of Classification Search

CPC ......... G01L 1/242; G01L 1/243; G01L 1/245; G01L 1/246; G01K 11/32; G01K 11/3206;

(Continued)

(56) References Cited

U.S. PATENT DOCUMENTS 4,960,989 A * 10/1990 Liebenrood ........ G01M 11/3145 356/73.1
4,997,277 A * 3/1991 Horiguchi .............. G01M 11/39 356/73.1

(Continued)

FOREIGN PATENT DOCUMENTS

| | | | |
|---|---|---|---|
| JP | 3667132 | B2 | 7/2005 |
| JP | 5654891 | B2 | 1/2015 |

*Primary Examiner* — Gordon J Stock, Jr.
(74) *Attorney, Agent, or Firm* — RANKIN, HILL & CLARK LLP

(57) ABSTRACT

An optical fiber characteristic measurement device (1) includes a light source (11) which emits laser light modulated at a prescribed modulation frequency, incident parts (12, 13, 15, 16) which make the laser light, in the form of probe light (L1) and pump light (L2) incident on each of one end and the other end of an optical fiber (14), a photodetection unit (17) which has a photoelectric conversion element, a current source, and an amplifier circuit and detects light emitted from the optical fiber (14), a measurement unit (18) which measures characteristics of the optical fiber (14) using detection signals (D1) output from the photodetection unit (17), and a current-source control unit (19) which controls the current source on the basis of detection results of the photodetection unit (17) in a non-containing period that is a period during which the optical fiber (14) emits light which includes the probe light (L1) and does not include Brillouin scattered light.

8 Claims, 8 Drawing Sheets

(58) Field of Classification Search
CPC ............. G01K 11/3213; G01K 11/322; G01K 11/324; G01D 5/3537; G01D 5/35374; G01D 5/35377; G01D 5/3538; G01D 5/35367; G01D 5/353; G01D 5/35341; G01D 5/35345; G01D 5/35348; G01D 5/35351; G01D 5/35354; G01D 5/35358; G01D 5/35361; G01D 5/36364; G01M 11/30; G01M 11/31; G01M 11/3109; G01M 11/3118; G01M 11/3127; G01M 11/3136; G01M 11/3145; G01M 11/3154; G01M 11/3163; G01M 11/3172; G01M 11/3181; G01M 11/319; G01M 11/33; G01M 11/332; G01M 11/333; G01M 11/334; G01M 11/335; G01M 11/39
See application file for complete search history.

(56) References Cited

U.S. PATENT DOCUMENTS

| | | | | |
|---|---|---|---|---|
| 6,710,863 | B2 * | 3/2004 | Hotate | G01M 11/39<br>356/73.1 |
| 8,059,967 | B2 * | 11/2011 | Komamaki | H04B 10/508<br>398/16 |
| 8,115,913 | B2 * | 2/2012 | Komamaki | G01M 11/3145<br>356/73.1 |
| 8,144,314 | B2 * | 3/2012 | Yamamoto | G01M 11/319<br>356/73.1 |
| 11,402,296 | B2 * | 8/2022 | Matsuura | G01M 11/31 |
| 11,879,803 | B2 * | 1/2024 | Oda | G01M 11/338 |
| 12,339,144 | B2 * | 6/2025 | Matsuura | G01M 11/3109 |
| 2013/0308123 | A1 | 11/2013 | Kishi et al. | |
| 2015/0003834 | A1 * | 1/2015 | Shan | G01D 5/35364<br>398/116 |

* cited by examiner

OPTICAL FIBER CHARACTERISTIC MEASUREMENT DEVICE AND OPTICAL FIBER CHARACTERISTIC MEASUREMENT METHOD

TECHNICAL FIELD

The present invention relates to an optical fiber characteristic measurement device and an optical fiber characteristic measurement method.

BACKGROUND ART

In Brillouin scattered light which is generated due to light incident on an optical fiber, a spectrum (frequency) changes in accordance with changes in temperature and strain of the optical fiber. Optical fiber characteristic measurement devices in which such properties are used measure a temperature distribution and a strain distribution in a longitudinal direction of an optical fiber by detecting a change in frequency of Brillouin scattered light (Brillouin Frequency Shift: BFS) in the longitudinal direction of the optical fiber.

One of such optical fiber characteristic measurement devices is of a Brillouin Optical Correlation Domain Analysis (BOCDA) type disclosed in the following Patent Documents 1 and 2. In this type of optical fiber characteristic measurement device, frequency-modulated light (pump light and probe light) is made incident on each of both ends of an optical fiber. Furthermore, the characteristics of an optical fiber are measured using the properties in which the probe light is amplified through a stimulation Brillouin scattering phenomenon at a position in which modulation phases of the pump light and the probe light match (position in which a "correlation peak" appears).

CITATION LIST

Patent Document

[Patent Document 1]
[Patent Document 1] Japanese U.S. Patent No. 3667132
[Patent Document 2]
[Patent Document 2] Japanese U.S. Patent No. 5654891

SUMMARY OF INVENTION

Technical Problem

Incidentally, light emitted from an optical fiber is light obtained by making probe light and weak Brillouin scattered light overlap. Thus, detection signals obtained by detecting this light each include a component of Brillouin scattered light whose signal intensity is significantly lower than that of a component of the probe light. If such a detection signal is amplified using an amplifier, the amplifier will be saturated by the component of the probe light and will not be able to amplify the component of the Brillouin scattered light so that it has a sufficient level. For this reason, it is not possible to improve a signal-to-noise ratio (SN ratio) that is a ratio of the component of the Brillouin scattered light to noise.

Here, if the component of the probe light is removed from the detection signal and only the component of the Brillouin scattered light is amplified, it is possible to amplify the component of the Brillouin scattered light so that it has a sufficient level. Here, depending on a method of removing a component of probe light from a detection signal, for example, when an optical fiber is subjected to a sudden change in loss in addition to a disturbance such as bending, it is conceivable that the followability effect, such as measurement results not immediately following the change, may occur in some cases.

The present invention was made in consideration of the above circumstances, and an object of the present invention is to provide an optical fiber characteristic measurement device and an optical fiber characteristic measurement method which are capable of improving an SN ratio while suppressing the followability effect due to a disturbance.

Solution to Problem

In order to achieve the above object, an optical fiber characteristic measurement device (1 to 3) according to a first aspect of the present invention includes a light source (11) which emits laser light modulated at a prescribed modulation frequency, incident parts (12, 13, 15, 16) which makes the laser light, in the form of continuous light (L1) and pulsed light (L2), incident on each of one end and the other end of an optical fiber (14), a photodetection unit (17, 17A) which has a photoelectric conversion element (21), a current source (22) connected to the photoelectric conversion element, and an amplifier circuit (23) connected to a connection point (CP) between the photoelectric conversion element and the current source and detects light emitted from the optical fiber, a measurement unit (18) which measures characteristics of the optical fiber using detection signals (D1) output from the photodetection unit, and a current-source control unit (19) which controls the current source on the basis of detection results (D1, D2, D11) of the photodetection unit in a non-containing period (T2) that is a period during which the optical fiber emits light which includes the continuous light but does not include Brillouin scattered light.

According to an optical fiber characteristic measurement device according to a second aspect of the present invention, in the optical fiber characteristic measurement device according to the first aspect of the present invention, a period during (T) which the pulsed light is incident on the other end of the optical fiber is set to a time that is at least twice a reciprocation time required for the pulsed light to move forward and rearward between one end and the other end of the optical fiber, and the non-containing period is a period until the pulsed light is incident on the other end of the optical fiber, the reciprocation time has elapsed, and then the next pulsed light is incident on the other end of the optical fiber.

According to an optical fiber characteristic measurement device according to a third aspect of the present invention, in the optical fiber characteristic measurement device according to the second aspect of the present invention, the current-source control unit obtains detection results of the photodetection unit in the non-containing period using a synchronization signal (SY) having a period that is the same as a period during which the pulsed light is incident on the other end of the optical fiber.

According to an optical fiber characteristic measurement device according to a fourth aspect of the present invention, in the optical fiber characteristic measurement device according to the third aspect of the present invention, the current-source control unit obtains a detection signal (D1) output from the photodetection unit as the detection result of the photodetection unit.

According to an optical fiber characteristic measurement device according to a fifth aspect of the present invention, in the optical fiber characteristic measurement device according to the third aspect of the present invention, the measurement unit includes a synchronous detection device (20) which extracts a detection signal of detection signals output from the photodetection unit which is obtained by detecting light in the vicinity of a measurement point set in the optical fiber and synchronously detects the detection signal extracted using the synchronization signal, in which the current-source control unit obtains a detection signal (D2) extracted using the synchronous detection device as detection results of the photodetection unit.

According to an optical fiber characteristic measurement device according to a sixth aspect of the present invention, in the optical fiber characteristic measurement device according to the third aspect of the present invention, the photodetection unit includes a current detector (24) which detects a current flowing through the photoelectric conversion element, and the current-source control unit obtains detection results of the current detector as detection results (D11) of the photodetection unit.

According to an optical fiber characteristic measurement device according to a seventh aspect of the present invention, in the optical fiber characteristic measurement device according to the first aspect of the present invention, the current-source control unit controls the current source to remove a component of the continuous light included in the light detected using the photodetection unit on the basis of the detection results of the photodetection unit in the non-containing period.

An optical fiber characteristic measurement method according to an aspect of the present invention includes emitting, by a light source, laser light modulated at a prescribed modulation frequency, making, by incident parts, the laser light, in the form of continuous light (L1) and pulsed light (L2), incident on each of one end and the other end of an optical fiber (14), detecting, by a photodetection unit (17) having a photoelectric conversion element (21), a current source (22) connected to the photoelectric conversion element, and an amplifier circuit (23) connected to a connection point (CP) between the photoelectric conversion element and the current source, light emitted from the optical fiber, measuring, by a measurement unit, characteristics of the optical fiber using detection signals (D1) output from the photodetection unit, and controlling, by a current-source control unit, the current source on the basis of detection results of the photodetection unit in a non-containing period (T2) that is a period during which the optical fiber emits light which includes the continuous light but does not include Brillouin scattered light.

Advantageous Effects of Invention

According to the present invention, there is an advantage that it is possible to improve a signal-to-noise ratio while suppressing the followability effect due to a disturbance.

DESCRIPTION OF EMBODIMENTS

Figure 1:
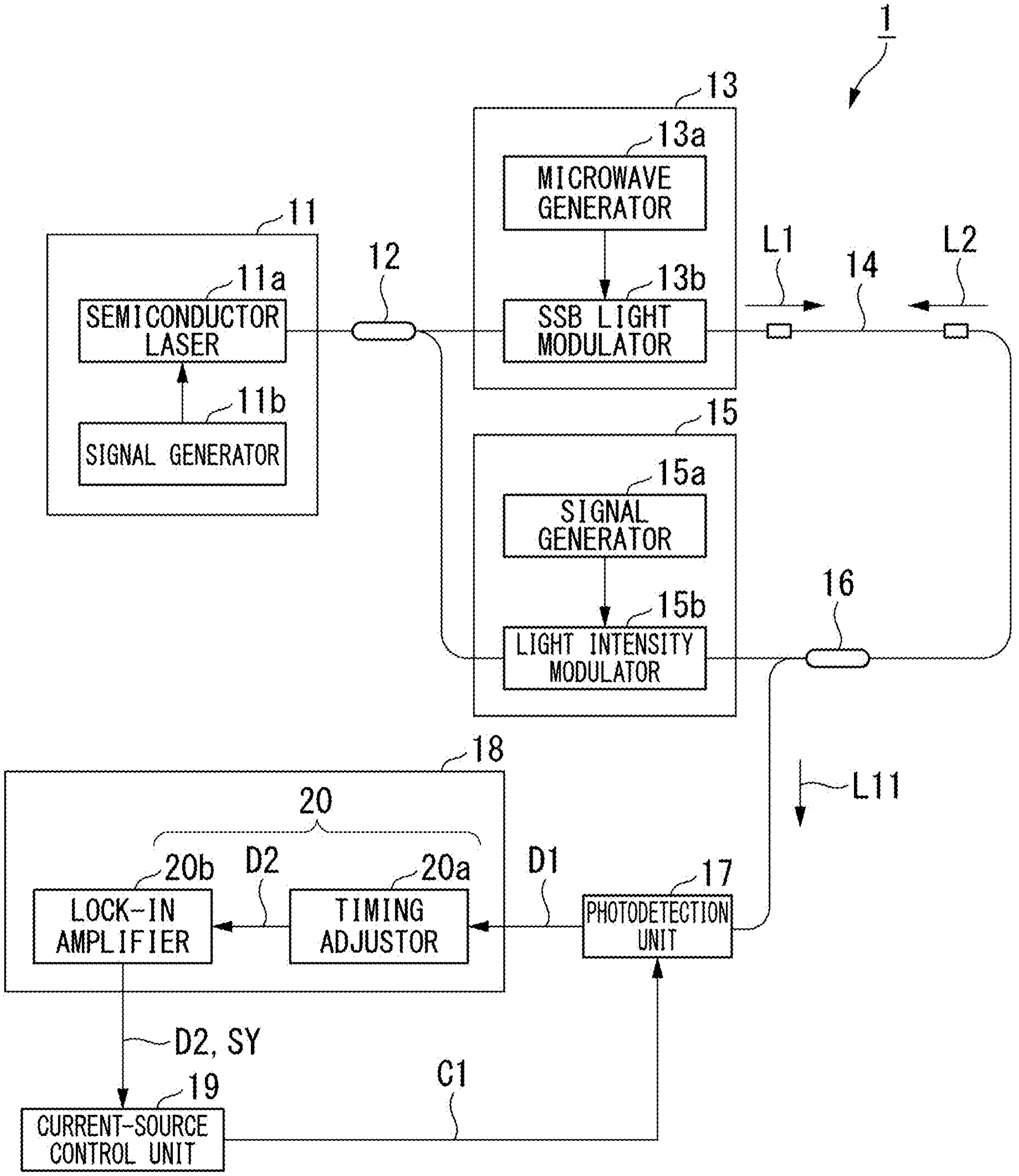
FIG. 1 A block diagram showing a main constitution of an optical fiber characteristic measurement device according to a first embodiment of the present invention.

An optical fiber characteristic measurement device and an optical fiber characteristic measurement method according to embodiments of the present invention will be described in detail below with reference to the drawings. In the following description, first, an outline of the embodiments of the present invention will be described, and then each of the embodiments of the present invention will be described in detail.

[Outline]

An embodiment of the present invention improves a signal-to-noise ratio (SN ratio) while suppressing the followability effect due to a disturbance in an optical fiber characteristic measurement device. Specifically, in an optical fiber characteristic measurement device of a Brillouin Optical Correlation Domain Analysis (BOCDA) method, a component of probe light is removed from a detection signal of light emitted from an optical fiber and only a component of Brillouin scattered light is amplified to improve a signal-to-noise ratio. At this time, even if a temperature or a strain of the optical fiber changes suddenly, measurement results thereof will immediately follow the change.

If light is incident on an optical fiber, a very small amount of scattered light is generated at each place in the optical fiber. Scattered light can be broadly divided into three types of light (Rayleigh scattered light, Brillouin scattered light, and Raman scattered light) based on a cause of generation thereof. Brillouin scattered light has a frequency which varies linearly with respect to a temperature and a strain applied to a fiber. Thus, if a position in which the Brillouin scattered light is generated and a frequency thereof are required, an optical fiber itself can be used as a strain sensor, a temperature sensor, or both a strain sensor and a temperature sensor. Active research and development regarding measurement techniques which can be applied to quality control of the installation of optical fibers themselves for communication and to structural soundness diagnosis or the like of social infrastructure such as bridges and dams and aircraft bodies using these properties is being conducted.

Brillouin scattering includes Spontaneous Brillouin Scattering (SpBS) and Stimulated Brillouin Scattering (SBS). The spontaneous Brillouin scattering is scattering caused due to spontaneously occurring acoustic waves. The stimulated Brillouin scattering is scattering caused due to an interaction of light with intense acoustic waves which occurs when two counter-propagating light satisfy specific conditions.

The optical fiber characteristic measurement devices of a BOCDA type disclosed in Patent Documents 1 and 2 described above make light which has been subjected to frequency modulation (FM modulation) using a sine wave incident on both ends of an optical fiber. Furthermore, inside the optical fiber, there is only one position in which modulation phases of these two light match (position in which a correlation peak appears). At this time, high-intensity stimulated Brillouin scattered light is generated at the position in which the correlation peak appears and low-intensity stimulated Brillouin scattered light is generated at positions other than the position.

If a spectrum (Brillouin Gain Spectrum: BGS) of all stimulated Brillouin scattered light generated in an optical fiber is observed, a shape of the spectrum near a maximum value thereof is dominated by a shape of the stimulated Brillouin scattered light generated at the position in which the correlation peak appears. That is to say, it is possible to acquire information regarding a temperature or a strain at the position in which the correlation peak appears from a frequency difference (Brillouin Frequency Shift: BFS) between the frequency of the maximum value thereof and the incident light by observing a spectrum of stimulated Brillouin scattered light generated at the position in which the correlation peak appears.

The position in which the correlation peak appears can be moved by changing a frequency of frequency modulation. For this reason, by moving the position in which the correlation peak appears in a longitudinal direction of the optical fiber, it is possible to obtain information regarding the temperature or the strain at any position in the longitudinal direction of the optical fiber.

On the other hand, when the light which is incident on the optical fiber is subjected to frequency modulation using a sine wave, correlation peaks appear at regular intervals in the longitudinal direction of the optical fiber. In order to ensure that there is only one correlation peak at any one position in an optical fiber, a length of the optical fiber needs to be shorter than a gap between the correlation peaks. As one method for circumventing this limitation, there is the so-called time-gating method disclosed in Patent Document 2 described above. In short, the time-gating method is a method of extracting only a detection signal obtained by detecting light generated at and in the vicinity of a measurement point set in an optical fiber in light sequentially emitted from the optical fiber. Thus, even if there are a plurality of positions in which correlation peaks appear in the optical fiber, only a detection signal obtained by detecting light generated at and in the vicinity of the measurement point set in the optical fiber is obtained.

In such an optical fiber characteristic measurement device of a BOCDA type, light obtained by making probe light and weak Brillouin scattered light overlap is detected. The detection signal obtained by detecting this light includes a component of the Brillouin scattered light which has a significantly lower signal intensity than a component of the probe light. If such a detection signal is amplified through an amplifier, the amplifier will be saturated by the component of the probe light and the component of the Brillouin scattered light cannot be amplified to have a sufficient level. For this reason, it is not possible to improve a signal-to-noise ratio (SNR) that is a ratio of a component of Brillouin scattered light to noise.

Here, if a component of the probe light is removed from a detection signal and only a component of the Brillouin scattered light is amplified, it is possible to amplify the component of the Brillouin scattered light so that it has a sufficient level. Here, depending on a method of removing a component of the probe light from a detection signal, when the temperature or the strain of the optical fiber changes suddenly, it is conceivable that the followability effect such as measurement results not immediately following the change may occur in some cases.

In the embodiment, first, laser light modulated at a prescribed modulation frequency is made, in the form of continuous light and pulsed light, incident on each of one end and the other end of an optical fiber. Subsequently, light emitted from an optical fiber is detected using a photodetection unit which has a photoelectric conversion element, a current source connected to the photoelectric conversion element, and an amplifier circuit connected to a connection point between the photoelectric conversion element and the current source. Subsequently, a current source provided in a photodetection unit is controlled on the basis of detection results of the photodetection unit in a non-containing period during which light which includes continuous light and does not include Brillouin scattered light is emitted from an optical fiber. Furthermore, the characteristics of the optical fiber are measured using a detection signal output from the photodetection unit. Thus, it is possible to improve a signal-to-noise ratio while suppressing the followability effect due to a disturbance.

First Embodiment

<Optical Fiber Characteristic Measurement Device>

FIG. 1 is a block diagram showing a main constitution of an optical fiber characteristic measurement device according to a first embodiment of the present invention. As shown in FIG. 1, an optical fiber characteristic measurement device 1 in the embodiment includes a light source 11, an light brancher 12 (incident part), an light modulator 13 (incident part), an optical fiber 14, a pulse modulator 15 (incident part), a directional coupler 16 (incident part), a photodetection unit 17, a measurement unit 18, and a current-source control unit 19. Such an optical fiber characteristic measurement device 1 measures characteristics (for example, a temperature distribution, a strain distribution, and the like) in a longitudinal direction of the optical fiber 14.

The light source 11 includes a semiconductor laser 11*a* and a signal generator 11*b* and emits laser light modulated at a prescribed modulation frequency $f_m$. The semiconductor laser 11*a* emits, for example, laser light having a wavelength (for example, 1.55 μm) which is less absorbed by the optical fiber 14. The signal generator 11*b* outputs, to the semiconductor laser 11*a*, a sine wave signal (modulation signal) obtained by subjecting laser light emitted from the semiconductor laser 11*a* to frequency modulation at the modulation frequency $f_m$. The light brancher 12 branches laser light emitted from the light source 11 into, for example, two light with an intensity ratio of 1:1.

The light modulator 13 includes a microwave generator 13*a* and a Single Side Band (SSB) light modulator 13*b*. The light modulator 13 modulates (performs an optical frequency shift on) one of the laser light branched through the light brancher 12 to generate a side band (single side band) with respect to a central frequency of the laser light. In the embodiment, it is assumed that single side band waves on a low frequency side are output from the light modulator 13.

The microwave generator 13*a* outputs microwaves having a frequency corresponding to a frequency shift to be imparted to one of the laser light branched through the light brancher 12. The SSB light modulator 13*b* generates single side band waves having a frequency difference that is the same as a frequency of microwaves output from the microwave generator 13*a* with respect to a central frequency of input light. The frequency of the microwaves output from the microwave generator 13*a* is variable. The light modulated through the light modulator 13 is incident, in the form of probe light L1 (continuous light), on one end of the optical fiber 14 and into the optical fiber 14.

The pulse modulator 15 includes a signal generator 15*a* and a light intensity modulator 15*b* and makes the other of the laser light branched through the light brancher 12 have a pulsed form to generate pulsed light. Here, the pulse modulator 15 generates pulsed light with a period T which is set to at least twice a time required for the pulsed light to move forward and rearward between one end and the other end of the optical fiber 14. The signal generator 15*a* outputs a timing signal which defines a timing of pulsing laser light. The light intensity modulator 15*b* is, for example, an Electro-Optic (EO) switch and pulses laser light from the light brancher 12 at a timing determined using a timing signal output from the signal generator 15*a*.

The directional coupler 16 makes the pulsed laser light output from the pulse modulator 15, in the form of pump light L2 (pulsed light), incident on the other end of the optical fiber 14 and into the optical fiber 14. Furthermore, the directional coupler 16 emits, toward the photodetection unit 17, light (detection light L11) which includes the probe light L1 propagating through the optical fiber 14 and emitted from the other end of the optical fiber 14. An intensity of the detection light L11 is affected by a stimulation Brillouin scattering phenomenon occurring in the optical fiber 14. The photodetection unit 17 detects (receives) the detection light L11 and outputs a detection signal D1.

Figure 2:
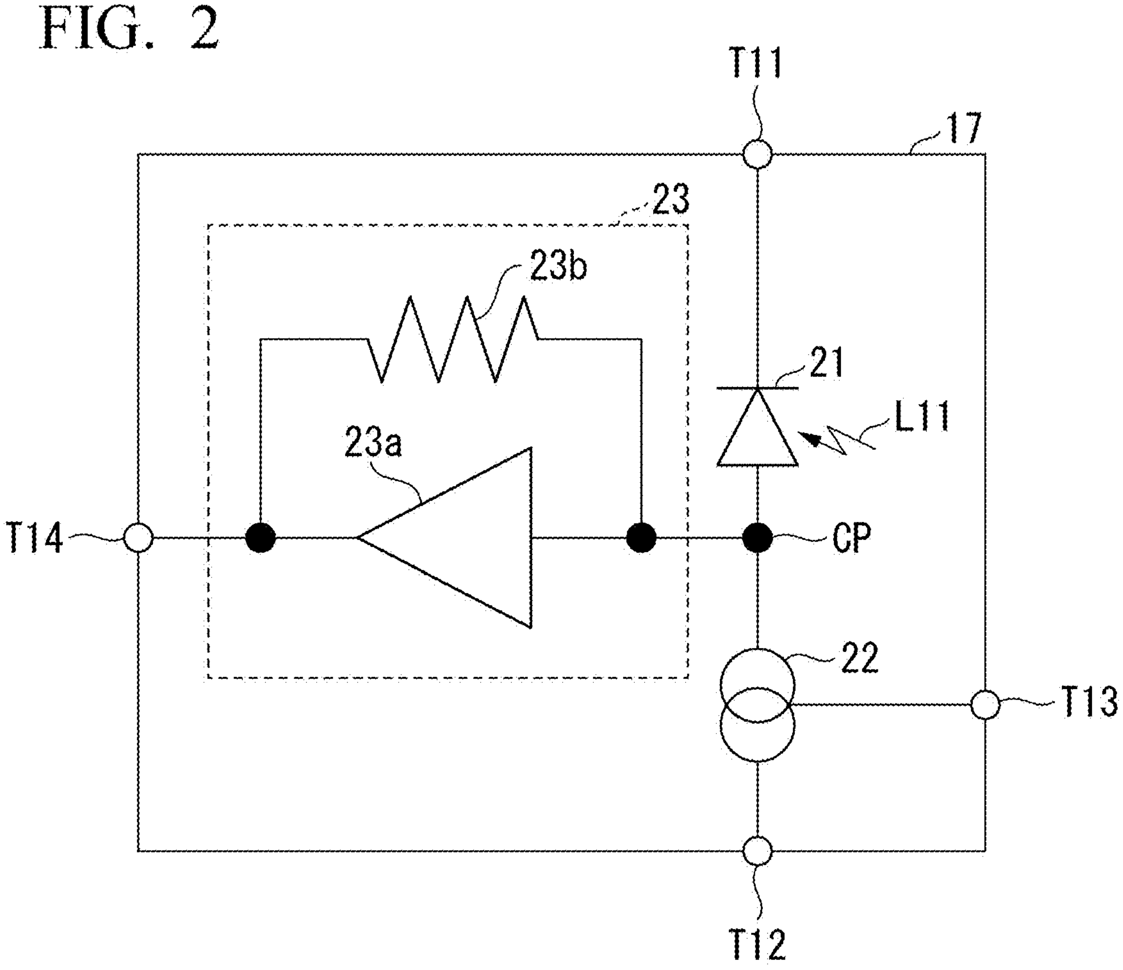
FIG. 2 A circuit diagram showing a main constitution of a photodetection unit provided in the optical fiber characteristic measurement device according to the first embodiment of the present invention.

FIG. 2 is a circuit diagram showing a main constitution of a photodetection unit provided in the optical fiber characteristic measurement device according to the first embodiment of the present invention. As shown in FIG. 2, the photodetection unit 17 includes a photodiode 21 (photoelectric conversion element), a current source 22, and an amplifier circuit 23.

The photodiode 21 photoelectrically converts the detection light L11 and outputs a current according to the detection light L11. As the photodiode 21, for example, a highly-sensitive light receiving element such as an avalanche photodiode can be used. A cathode of the photodiode 21 is connected to a bias terminal T11 and an anode of the photodiode 21 is connected to one end of the current source 22. The bias terminal T11 is a terminal to which a bias voltage applied to the photodiode 21 is input.

The current source 22 outputs a current according to a control signal C1 (which will be described in detail below) input from a control signal input terminal T13. The current source 22 is provided for removing a component of the probe light L1 included in the detection light L11 from a current output from the photodiode 21. One end of the current source 22 is connected to the anode of the photodiode 21 and the other end of the current source 22 is connected to the negative power supply terminal T12.

The amplifier circuit 23 amplifies a current output from the photodiode 21 (precisely, a current obtained by subtracting a current flowing through the current source 22 from a current output from the photodiode 21), converts the amplified current into a voltage, and outputs the voltage. The amplifier circuit 23 includes an amplifier 23*a* and a feedback resistor 23*b*. An input end of the amplifier 23*a* is connected to the connection point CP between the photodiode 21 and the current source 22 and an output end of the amplifier 23*a* is connected to an output terminal T14. The feedback resistor 23*b* is connected between the input end and the output end of the amplifier 23*a* and forms a current-to-voltage conversion circuit together with the amplifier 23*a*. For this reason, each detection signal D1 output from the output terminal T14 has a voltage corresponding to a current obtained by subtracting the current which has flowed through the current source 22 from the current output from the photodiode 21.

The measurement unit 18 measures the characteristic in the longitudinal direction of the optical fiber 14 using each detection signal D1 output from the photodetection unit 17. The measurement unit 18 includes a synchronous detection device 20 which performs synchronous detection of the detection signal D1 output from the photodetection unit 17. The synchronous detection device 20 extracts, from among the detection signals D1 output from the photodetection unit 17, a detection signal obtained by detecting light including stimulated Brillouin scattered light generated at and in the vicinity of a measurement point (a point at which a characteristic is to be measured) set in the optical fiber 14. Furthermore, a detection signal D2 obtained through extraction in which a synchronization signal SY (refer to FIG. 3) having a prescribed period is used is synchronously detected. The synchronous detection device 20 includes a timing adjuster 20*a* and a lock-in amplifier 20*b* (synchronous detector).

The timing adjuster 20*a* is realized using, for example, an electrical switch (high-speed analog switch) which can quickly switch between an on state (a state in which the detection signal D1 passes) and an off state (a state in which the detection signal D1 is blocked). The timing adjuster 20*a* extracts a detection signal from among the detection signals D1 output from the photodetection unit 17 by passing a detection signal obtained by detecting light including stimulated Brillouin scattered light generated at and in the vicinity of a measurement point set in the optical fiber 14. An operation period of the timing adjuster 20*a* is set to a half period of the period of the synchronization signal SY.

The lock-in amplifier 20*b* uses the above-described synchronization signal SY to synchronously detect the detection signal D2 (the detection signal which is subjected to extraction using the timing adjuster 20*a*) which has passed through the timing adjuster 20*a*. Here, a period of the synchronization signal SY is set to a period that is the same as a period during which the pump light L2 is incident on the other end of the optical fiber 14 (at least twice the time it takes for the pulsed light to move forward and rearward between one end and the other end of the optical fiber 14). A configuration of the lock-in amplifier 20*b* is the same as that disclosed in Patent Document 2, except that it is configured to be able to output the detection signal D2 and the synchronization signal SY to the outside. Thus, a detailed description thereof will be omitted.

The current-source control unit 19 generates a control signal C1 which controls the current source 22 of the photodetection unit 17 using the detection signal D2 (the detection results of the photodetection unit) and the synchronization signal SY output from the lock-in amplifier 20*b*. Specifically, the current-source control unit 19 uses the detection signal D2 and the synchronization signal SY to extract a detection signal D1 output from the photodetection unit 17 during a period (T2: non-containing period in FIGS. 3 and 4) in which light including the probe light L1 but not including Brillouin scattered light is emitted from the optical fiber 14. Furthermore, the current-source control unit 19 generates a control signal C1 using the extracted detection signal D1 and outputs the generated control signal C1 to the photodetection unit 17.

Here, the detection signal D1 extracted using the detection signal D2 and the synchronization signal SY indicates an intensity of the probe light L1. The current-source control unit 19 generates a control signal C1 which can remove a component of the probe light L1 included in the detection light L11 from a current output from the photodiode 21 shown in FIG. 2 on the basis of the extracted detection signal D1. The purpose of generating such a control signal C1 is to prevent the amplifier circuit 23 shown in FIG. 2 from being saturated due to the component of the probe light L1 and to improve a SN ratio (a ratio of the component of the Brillouin scattered light to noise) by amplifying the component of the Brillouin scattered light to a sufficient level.

<Optical Fiber Characteristic Measurement Method>

If measurement is started, a frequency-modulated laser light is emitted from the light source 11 at a modulation frequency $f_m$ (first step). The laser light emitted from the light source 11 is branched using the light brancher 12. One of the laser lights branched using the light brancher 12 is incident on the light modulator 13 and modulated using the light modulator 13*b*, generating a single side band for a central frequency of the laser light. Laser light (continuous light) having a single side band emitted from the light modulator 13 is, in the form of probe light L1, incident on one end of the optical fiber 14 and into the optical fiber 14 (second step).

On the other hand, the other of the laser lights branched using the light brancher 12 is incident on the pulse modulator 15 and is intensity-modulated using the light intensity modulator 15*b*, thereby being pulsed. Specifically, pulsed light is generated during the above-described period T (a period set to at least twice the time it takes for the pulsed light to move forward and rearward between one end and the other end of the optical fiber 14). The pulsed light passes, in the form of pump light L2, through the directional coupler 16, is incident on the other end of the optical fiber 14 and into the optical fiber 14 (second step).

If probe light L1 in the form of frequency-modulated continuous light at the modulation frequency $f_m$ and pump light L2 in the form of pulsed light are incident on the optical fiber 14 and into the optical fiber 14, correlation peaks are generated sequentially at different positions in the optical fiber 14 as the pump light L2 propagates through the optical fiber 14. At a position of each of the correlation peaks, the probe light L1 obtains a gain due to stimulated Brillouin amplification using the pump light L2.

If a frequency difference between pump light L2 and probe light L1 is changed using pump light L2 as a reference at the position of the correlation peak, a spectrum called a Brillouin gain spectrum (BGS) which has a shape of a Lorentz function using a Brillouin frequency shaft $v_B$ as a central frequency is obtained. This Brillouin frequency shaft $v_B$ changes depending on a material, a temperature, strain, or the like of the optical fiber 14 and is known to change linearly with respect to, particularly, strain. For this reason, it is possible to obtain an amount of strain of the optical fiber 14 by detecting a peak frequency of a Brillouin gain spectrum.

The probe light L1 transmitted through the optical fiber 14 and the stimulated Brillouin scattered light generated in the optical fiber 14 are emitted from the other end of the optical fiber 14 and then, in the form of detection light L11, incident on the photodetection unit 17 via the directional coupler 16. Furthermore, the detection light L11 is detected in the photodetection unit 17 and a detection signal D1 indicating the detection results is output from the photodetection unit 17 (third step). The detection signal D1 output from the photodetection unit 17 is input to the measurement unit 18 and synchronously detected using the synchronous detection device 20.

Figure 3:
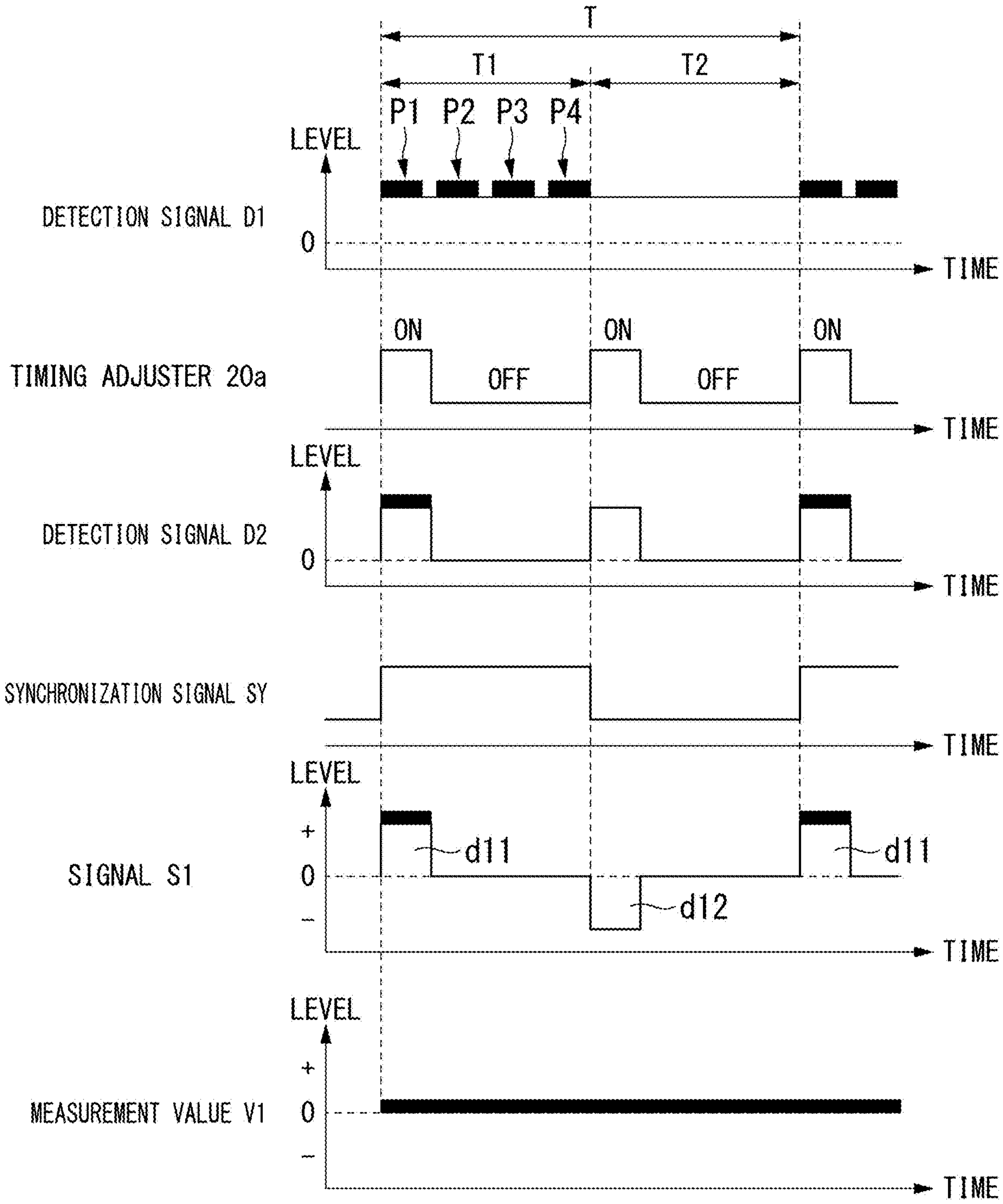
FIG. 3 A diagram for explaining a process performed in a synchronous detection device in the first embodiment of the present invention.

FIG. 3 is a diagram for explaining a process performed using the synchronous detection device in the first embodiment of the present invention. For the sake of simplicity in the following explanation, It is assumed that the period T (period of the synchronization signal SY) during which the pump light L2 is incident on the other end of the optical fiber 14 is set to twice the time it takes for the pump light L2 to move forward and rearward between one end and the other end of the optical fiber 14.

In the first half portion T1 of one period T of the synchronization signal SY, detection light L11 including probe light L1 transmitted through the optical fiber 14 and stimulated Brillouin scattered light generated in the optical fiber 14 is incident on the photodetection unit 17. For this reason, as shown in FIG. 3, a detection signal D1 affected by stimulated Brillouin scattered light is output from the photodetection unit 17. In FIG. 3, portions (for example, portions indicated by symbols P1 to P4) affected by stimulated Brillouin scattered light are represented by black bands.

On the other hand, during the second half portion T2 (non-containing period) of one period T of the synchronization signal SY, detection light L11 which includes probe light L1 through the optical fiber 14 but does not include stimulated Brillouin scattered light is incident on the photodetection unit 17. For this reason, as shown in FIG. 3, a detection signal D1 which is not affected by stimulated Brillouin scattered light (a black band is not added) is output from the photodetection unit 17. Since the pump light L2 is repeatedly incident in a period T, a detection signal D1 which is affected by the stimulated Brillouin scattered light and a detection signal D2 which is not affected by the stimulated Brillouin scattered light are output alternately every T/2.

Here, as shown in FIG. 3, an operation period of the timing adjuster 20*a* is set to T/2, and in each period, the timing adjuster 20*a* performs an operation of detecting light including stimulated Brillouin scattered light generated at and in the vicinity of a measurement point set in the optical fiber 14 and passing a detection signal obtained through the detection. In the example shown in FIG. 3, the timing adjuster 20*a* is switched between an on state and an off state so that a portion of the detection signals D1 output from the photodetection unit 17 which is indicated by symbol P1 is caused to pass. Thus, the detection signal D2 shown in FIG. 3 which has been subjected to extraction using the timing adjuster 20*a* is input to the lock-in amplifier 20*b*.

If the detection signal D2 is input to the lock-in amplifier 20*b*, first, a process is performed in which the polarity of the detection signal D2 is alternately inverted using the synchronization signal SY. Specifically, a process in which the polarity is not inverted in the first half portion T1 of one period T of the synchronization signal SY, but is inverted in the second half portion T2 of one period T of the synchronization signal SY is performed. By performing such a process, a signal S1 in which the polarity of a portion of the detection signal D2 which is not affected by the stimulated Brillouin scattered light is inverted is obtained.

Subsequently, the signal S1 is subjected to a low-pass filter process. If the low-pass filter process is performed, a signal d11 corresponding to a detection signal obtained by detecting only the probe light L1 in the first half portion T1 and a signal d12 corresponding to a detection signal obtained by detecting only the probe light L1 in the second half portion T2 are cancelled out. Thus, a measurement value V1 output from the lock-in amplifier 20*b* indicates a level of stimulated Brillouin scattered light, as shown in FIG. 3. The above-described operations are repeatedly performed while changing a position of the measurement point set in the optical fiber 14 by changing an extraction timing of the timing adjuster 20*a*. Thus, the characteristics in the longitudinal direction of the optical fiber 14 are measured (fourth step).

Figure 4:
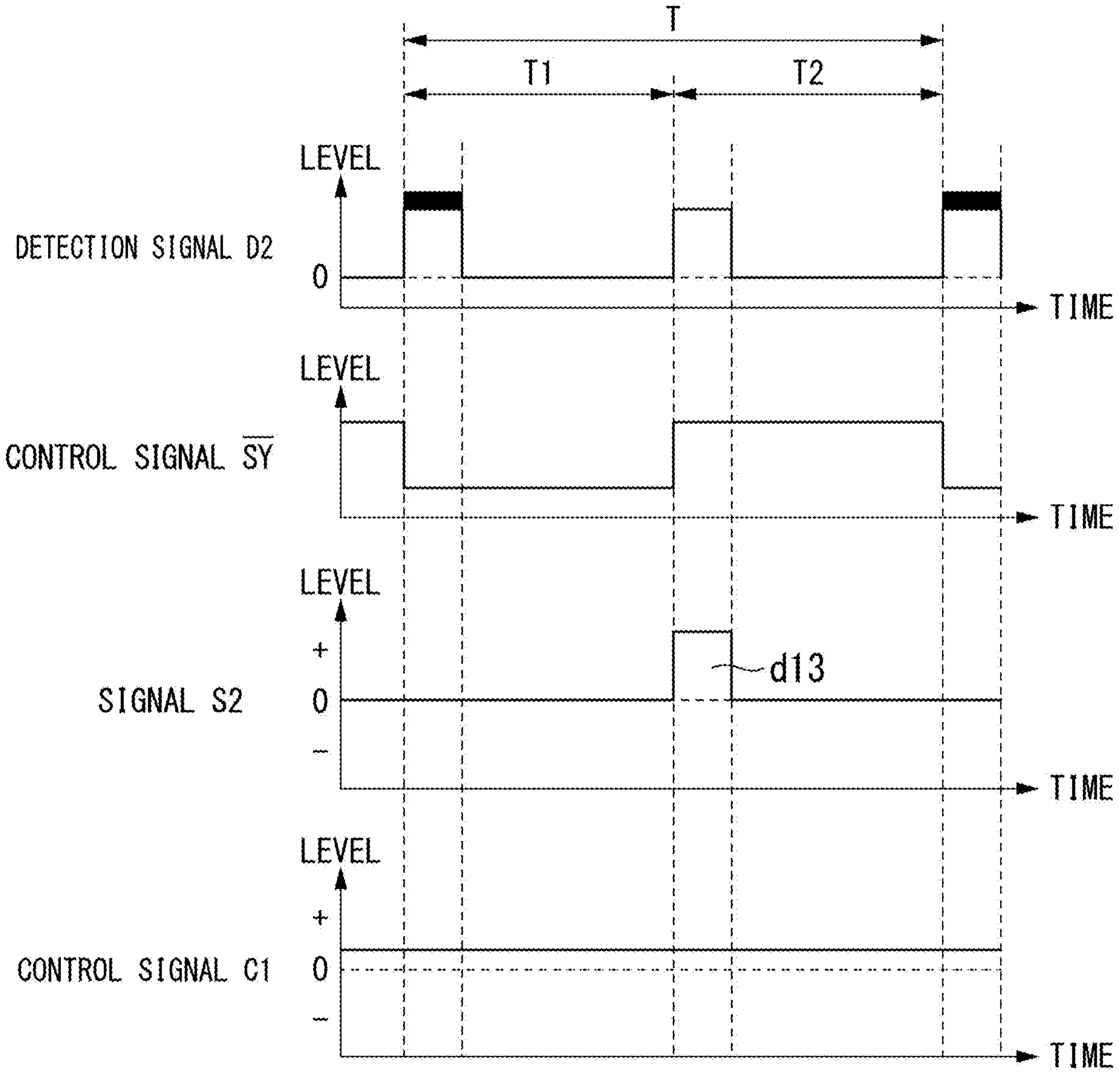
FIG. 4 A diagram for explaining a process performed in a current-source control unit in the first embodiment of the present invention.

FIG. 4 is a diagram for explaining a process performed in the current-source control unit in the first embodiment of the present invention. First, the current-source control unit 19 generates an inversion synchronization signal SY-obtained by inverting a synchronization signal SY output from the lock-in amplifier 20*b* and extracts a signal S2 from the detection signal D2 using the generated inversion synchronization signal $\overline{SY}$. In this specification, for convenience of notation, a symbol "SY" with a symbol "–" attached to an upper portion thereof will be represented as a symbol "SY⁻."

Subsequently, the current-source control unit 19 smoothes the extracted signal S2 over one period T of the synchronization signal SY and appropriately amplifies the smoothed extracted signal S2 to generate a control signal C1. Furthermore, the current-source control unit 19 outputs the generated control signal C1 to the photodetection unit 17 to control the current output from the current source 22 (fifth step). The current-source control unit 19 generates a control signal C1 every period T of the synchronization signal SY.

Here, the signal S2 extracted using the current-source control unit 19 is a signal d13 corresponding to a detection signal obtained by detecting only the probe light L1 in the second half portion T2. For this reason, by generating a control signal C1 in response to a signal d13 and controlling the current source 22, a current of the current output from the photodiode 21 which is derived from the probe light L1 included in the detection light L11 can be caused to flow (absorbed) through the current source 22. Thus, the amplifier circuit 23 is not saturated by a component of the probe light L1 and a component of the Brillouin scattered light is amplified to a sufficient level.

As described above, in the embodiment, the current source 22 is controlled on the basis of the detection results of the photodetection unit 17 during a period (the second half portion T2 of one period T of the synchronization signal SY) during which light that includes the probe light L1 but does not include Brillouin scattered light is emitted from the optical fiber 14. Thus, the amplifier circuit 23 is not saturated by the component of the probe light L1 and the component of the Brillouin scattered light is amplified to a sufficient level, making it possible to improve an SN ratio (a ratio of the component of the Brillouin scattered light to noise).

Also, in the embodiment, a time width required for generating the control signal C1 is at most one period of the synchronization signal SY. For this reason, for example, even if a disturbance such as bending is applied to the optical fiber 14 and the loss changes suddenly, it is possible to suppress the followability effect such as the measurement result not immediately following the change.

Second Embodiment

Figure 5:
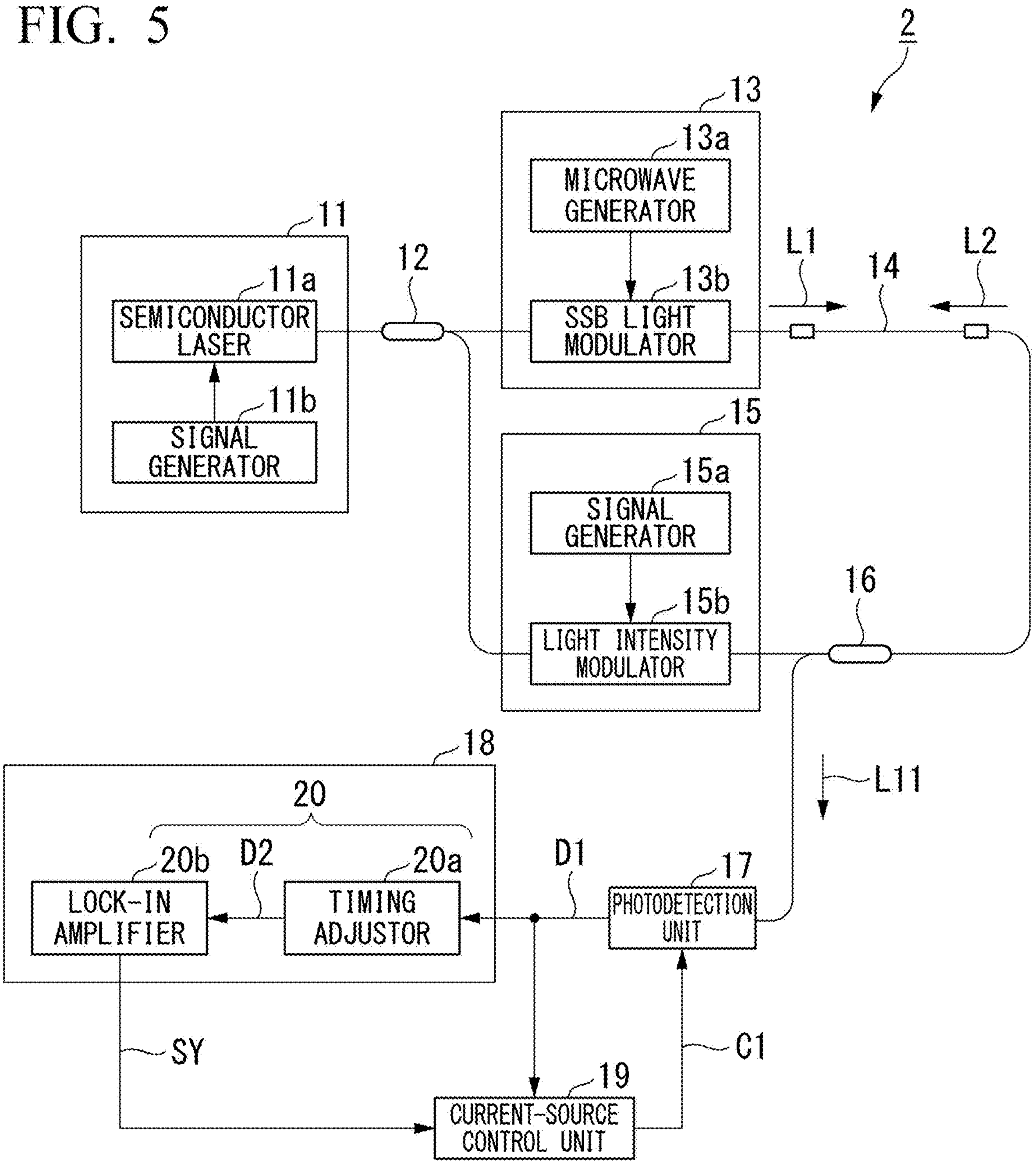
FIG. 5 A block diagram showing a main constitution of an optical fiber characteristic measurement device according to a second embodiment of the present invention.

FIG. 5 is a block diagram showing a main constitution of an optical fiber characteristic measurement device according to a second embodiment of the present invention. In FIG. 5, constituent elements that are the same as those shown in FIG. 1 are denoted by the same symbols. The optical fiber characteristic measurement device 2 in the embodiment has a basic constitution that is the same as that of the optical fiber characteristic measurement device 1 shown in FIG. 1, but differs in that a control signal C1 is generated using a detection signal D1 (detection results of the photodetection unit) output from the photodetection unit 17.

As shown in FIG. 5, the current-source control unit 19 receives, as inputs, the detection signal D1 output from the photodetection unit 17 and the synchronization signal SY output from the lock-in amplifier 20*b*. The current-source control unit 19 generates a control signal C1 using these detection signal D1 and synchronization signal SY.

Figure 6:
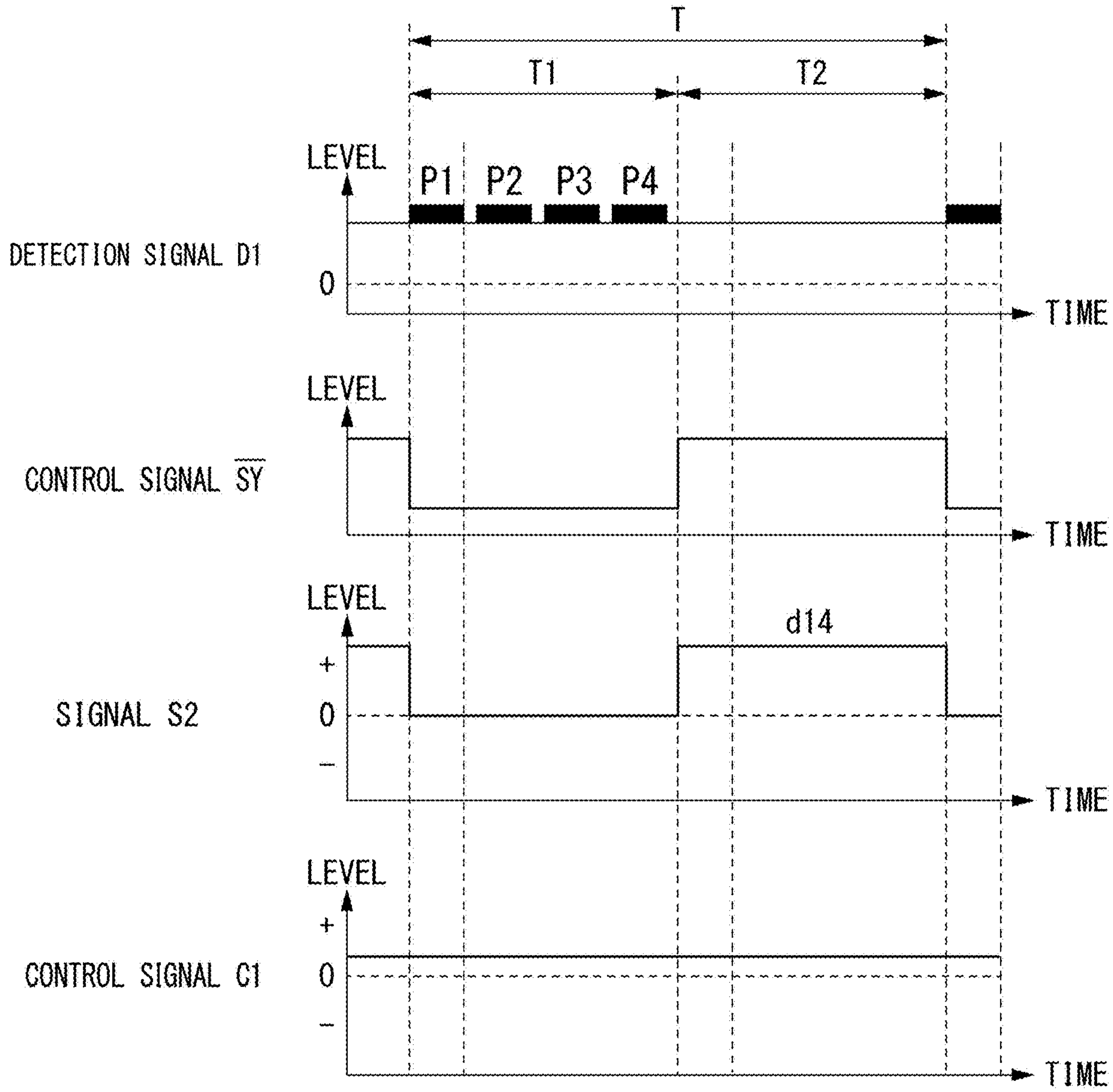
FIG. 6 A diagram for explaining a process performed in a current-source control unit in the second embodiment of the present invention.

FIG. 6 is a diagram for explaining a process performed using a current-source control unit in the second embodiment of the present invention. As in the first embodiment, the current-source control unit 19 generates an inversion synchronization signal SY-obtained by inverting the synchronization signal SY output from the lock-in amplifier 20*b* and extracts a signal S2 from detection signal D1 using the generated inversion synchronization signal $\overline{SY}$. Furthermore, the current-source control unit 19 smoothes the extracted signal S2 over one period T of the synchronization signal SY and appropriately amplifies the smoothen extracted signal S2 to generate a control signal C1.

Here, the signal S2 extracted using the current-source control unit 19 is a signal D14 which corresponds to a detection signal obtained by detecting only the probe light L1 in the entire second half portion T2 (T/2). For this reason, by generating a control signal C1 in response to the signal D14 and controlling the current source 22, a current of the current output from the photodiode 21 which is derived from the probe light L1 included in the detection light L11 can be caused to flow (absorbed) through the current source 22. Thus, the amplifier circuit 23 is not saturated by the component of the probe light L1 and the component of the Brillouin scattered light is amplified to a sufficient level.

The optical fiber characteristic measurement device 2 in the embodiment differs from the optical fiber characteristic measurement device 1 shown in FIG. 1 only in the way in which the control signal C1 is generated and a basic operation of the optical fiber characteristic measurement device 2 is the same as that of the optical fiber characteristic measurement device 1. For this reason, the details of the operation of the optical fiber characteristic measurement device 2 will be omitted.

As described above, also in the embodiment, the current source 22 is controlled on the basis of the detection results of the photodetection unit 17 during a period (the second half portion T2 of one period T of the synchronization signal SY) during which light which includes the probe light L1 but does not include Brillouin scattered light is emitted from the optical fiber 14. Thus, the amplifier circuit 23 is not saturated by the component of the probe light L1 and the component of the Brillouin scattered light is amplified to a sufficient level, making it possible to improve an SN ratio (a ratio of the component of the Brillouin scattered light component to noise).

Moreover, also in the embodiment, a time width required for generating the control signal C1 is at most one period of the synchronization signal SY. For this reason, for example, even if a disturbance such as bending is applied to the optical fiber 14 and the loss changes suddenly, it is possible to suppress the followability effect in which the measurement result does not immediately follow the change.

Third Embodiment

Figure 7:
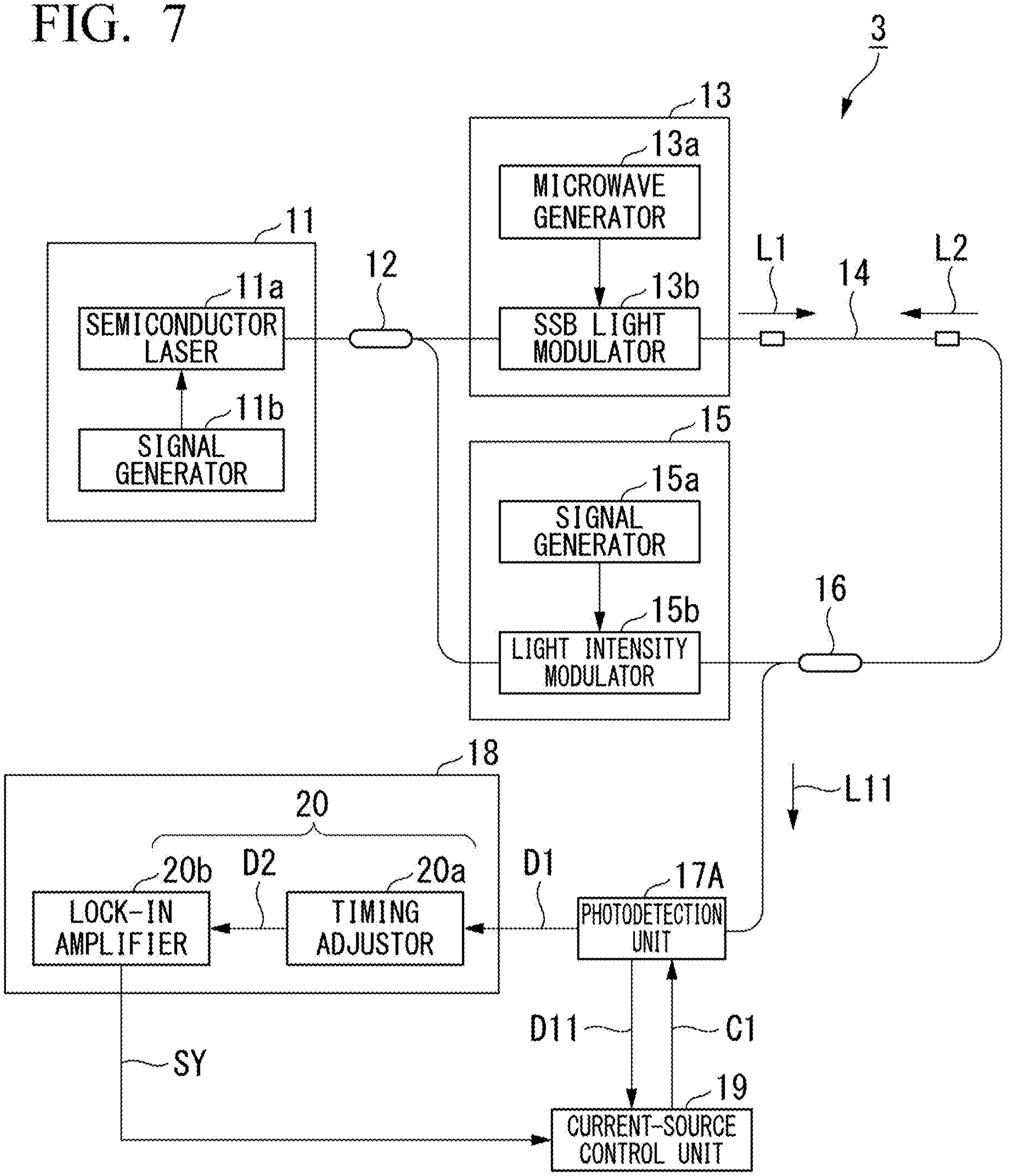
FIG. 7 A block diagram showing a main constitution of an optical fiber characteristic measurement device according to a third embodiment of the present invention.

FIG. 7 is a block diagram showing a main constitution of an optical fiber characteristic measurement device according to a third embodiment of the present invention. In FIG. 7, constituent elements that are the same as those shown in FIGS. 1 and 5 are denoted by the same symbols. The optical fiber characteristic measurement device 3 in the embodiment is constituted so that the photodetection unit 17 of the optical fiber characteristic measurement devices 1 and 2 shown in FIGS. 1 and 5 is replaced with the photodetection unit 17A and a control signal C1 is generated using a current detection signal D11 (detection results of the photodetection unit) output from the photodetection unit 17A.

Figure 8:
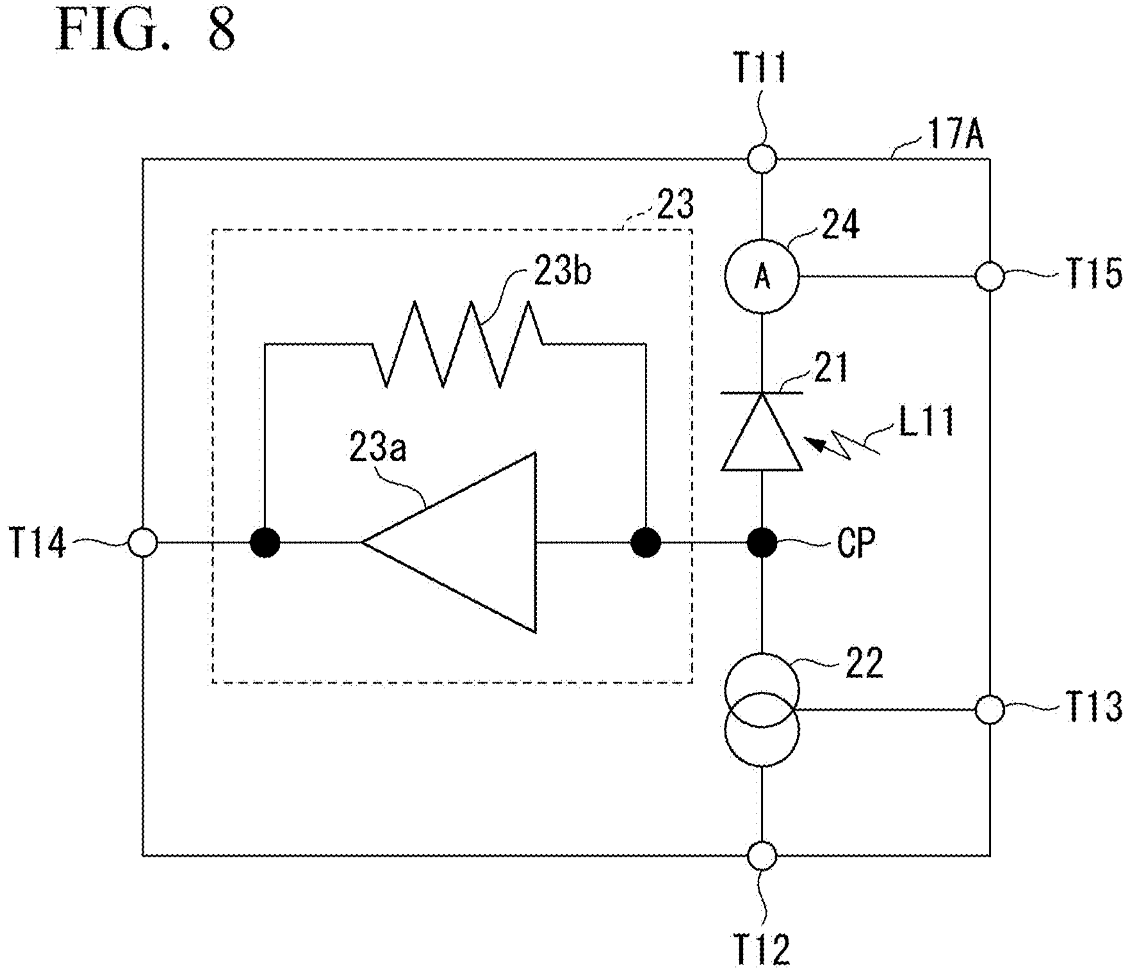
FIG. 8 A circuit diagram showing a main constitution of a photodetection unit provided in the optical fiber characteristic measurement device according to the third embodiment of the present invention.

FIG. 8 is a circuit diagram showing a main constitution of a photodetection unit provided in the optical fiber characteristic measurement device according to the third embodiment of the present invention. In FIG. 8, constituent elements that are the same as those shown in FIG. 2 are denoted by the same symbols. As shown in FIG. 8, the photodetection unit 17A includes a current detector 24, in addition to the photodiode 21, the current source 22, and the amplifier circuit 23.

The current detector 24 is provided between the photodiode 21 and the bias terminal T11 and detects a current output from the photodiode 21. The current detector 24 may be provided between the photodiode 21 and the connection point CP. The detection results of the current detector 24 are output, in the form of current detection signal D11, from a current detection signal output terminal T15.

As shown in FIG. 7, the current-source control unit 19 receives, as inputs, the current detection signal D11 output from the photodetection unit 17A and the synchronization signal SY output from the lock-in amplifier 20*b*. The current-source control unit 19 generates a control signal C1 using these current detection signal D11 and synchronization signal SY. A process performed using the current-source control unit 19 to generate the control signal C1 is the same as the process performed using the current-source control unit 19 in the first and second embodiments.

That is to say, the current-source control unit 19 first performs a process of generating an inversion synchronization signal $SY^-$ obtained by inverting the synchronization signal SY output from the lock-in amplifier 20*b* and then using the generated inversion synchronization signal $SY^-$ to extract a signal corresponding to the signal S2 from the current detection signal D11. Subsequently, a process of smoothing the extracted signal over one period T of the synchronization signal SY and appropriately amplifying the smoothed extracted signal to generate a control signal C1 is performed.

The optical fiber characteristic measurement device 3 in the embodiment differs from the optical fiber characteristic measurement devices 1 and 2 shown in FIGS. 1 and 5 only in the way in which the control signal C1 is generated and a basic operation of the optical fiber characteristic measurement device 3 is the same as that of the optical fiber characteristic measurement devices 1 and 2. For this reason, the details of the operation of the optical fiber characteristic measurement device 3 will be omitted.

As described above, also in the embodiment, the current source 22 is controlled on the basis of the detection results of the photodetection unit 17 during a period (the second half portion T2 of one period T of the synchronization signal SY) during which light which includes the probe light L1 but does not include Brillouin scattered light is emitted from the optical fiber 14. Thus, the amplifier circuit 23 is not saturated by the component of the probe light L1 and the component of the Brillouin scattered light is amplified to a sufficient level, making it possible to improve an SN ratio (a ratio of the component of the Brillouin scattered light to noise).

Moreover, also in the embodiment, a time width required for generating the control signal C1 is at most one period of the synchronization signal SY. For this reason, even if a disturbance such as bending is applied to the optical fiber 14 and the loss changes suddenly, it is possible to suppress the followability effect such as the measurement result which does not immediately follow the change.

Although the optical fiber characteristic measurement device and the optical fiber characteristic measurement method according to the embodiment of the present invention have been described above, the present invention is not limited to the above embodiment and can be freely modified within the scope of the present invention. For example, in the above-described first to third embodiments, an example in which the current-source control unit 19 smoothes the extracted signal S2 over one period T of the synchronization signal SY and appropriately amplifies the smoothed extracted signal S2 to generate the control signal C1 has been described. Here, the current-source control unit 19 may sample the extracted signal S2 (the signals d13 and d14) or a signal level corresponding to the signal S2, hold the sampled signal S2 for one period T of the synchronization signal SY, and control the control signal C1 on the basis of the sampled signal level. Furthermore, the time width required for generating the control signal C1 is not limited to within one period of the synchronization signal SY and the value of the control signal C1 before that period may be used by weighting the value as necessary.

REFERENCE SIGNS LIST

1 to 3 Optical fiber characteristic measurement device
11 Light source
12 Light brancher
13 Light modulator
14 Optical fiber
15 Pulse modulator
16 Directional coupler
17, 17A Photodetection unit
18 Measurement unit
19 Current-source control unit
20 Synchronous detection device
21 Photodiode
22 Current source
23 Amplifier circuit
24 Current detector
CP Connection point
D1, D2 Detection signal
D11 Current detection signal
L1 Probe light
L2 Pump light
SY Synchronization signal
T Period
T2 Second half portion

The invention claimed is:

1. An optical fiber characteristic measurement device, comprising:
- a light source which emits laser light modulated at a prescribed modulation frequency;
- incident parts which make the laser light, in the form of continuous light and pulsed light, incident on each of one end and the other end of an optical fiber;
- a photodetection unit which has a photoelectric conversion element, a current source connected to the photoelectric conversion element, and an amplifier circuit connected to a connection point between the photoelectric conversion element and the current source and detects light emitted from the optical fiber;

a measurement unit which measures characteristics of the optical fiber using detection signals output from the photodetection unit; and a current-source control unit which controls the current source on the basis of detection results of the photodetection unit in a non-containing period that is a period during which the optical fiber emits light which includes the continuous light but does not include Brillouin scattered light.

2. The optical fiber characteristic measurement device according to claim 1, wherein the current-source control unit controls the current source to remove a component of the continuous light included in the light detected using the photodetection unit on the basis of the detection results of the photodetection unit in the non-containing period.

3. The optical fiber characteristic measurement device according to claim 1, wherein a period during which the pulsed light is incident on the other end of the optical fiber is set to a time that is at least twice a reciprocation time required for the pulsed light to move forward and rearward between one end and the other end of the optical fiber, and the non-containing period is a period until the pulsed light is incident on the other end of the optical fiber, the reciprocation time has elapsed, and then the next pulsed light is incident on the other end of the optical fiber.

4. The optical fiber characteristic measurement device according to claim 3, wherein the current-source control unit obtains detection results of the photodetection unit in the non-containing period using a synchronization signal having a period that is the same as a period during which the pulsed light is incident on the other end of the optical fiber.

5. The optical fiber characteristic measurement device according to claim 4, wherein the current-source control unit obtains a detection signal output from the photodetection unit as the detection result of the photodetection unit.

6. The optical fiber characteristic measurement device according to claim 4, wherein the measurement unit includes a synchronous detection device which extracts a detection signal of detection signals output from the photodetection unit which is obtained by detecting light in the vicinity of a measurement point set in the optical fiber and synchronously detects the detection signal extracted using the synchronization signal, wherein the current-source control unit obtains a detection signal extracted using the synchronous detection device as detection results of the photodetection unit.

7. The optical fiber characteristic measurement device according to claim 4, wherein the photodetection unit includes a current detector which detects a current flowing through the photoelectric conversion element, and the current-source control unit obtains detection results of the current detector as detection results of the photodetection unit.

8. An optical fiber characteristic measurement method, comprising:

emitting, by a light source, laser light modulated at a prescribed modulation frequency;

making, by incident parts, the laser light, in the form of continuous light and pulsed light, incident on each of one end and the other end of an optical fiber;

detecting, by a photodetection unit having a photoelectric conversion element, a current source connected to the photoelectric conversion element, and an amplifier circuit connected to a connection point between the photoelectric conversion element and the current source, light emitted from the optical fiber;

measuring, by a measurement unit, characteristics of the optical fiber using detection signals output from the photodetection unit; and controlling, by a current-source control unit, the current source on the basis of detection results of the photodetection unit in a non-containing period that is a period during which the optical fiber emits light which includes the continuous light but does not include Brillouin scattered light.

* * * * *